(12) United States Patent  (10) Patent No.: US 8,659,626 B2
Bengtsson  (45) Date of Patent: Feb. 25, 2014

(54) PROJECTION CONTROL

(75) Inventor: Henrik Bengtsson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 540 days.

(21) Appl. No.: 12/970,133

(22) Filed: Dec. 16, 2010

(65) Prior Publication Data

US 2012/0154445 A1  Jun. 21, 2012

(51) Int. Cl.
*G09G 5/00* (2006.01)
*G03B 21/26* (2006.01)

(52) U.S. Cl.
USPC ............................. 345/672; 345/660; 353/28

(58) Field of Classification Search
None
See application file for complete search history.

(56) References Cited

U.S. PATENT DOCUMENTS 7,874,681 B2 *  1/2011  Huebner ..................... 353/28
2011/0216288 A1 *  9/2011  Rutledge et al. ............ 353/70

* cited by examiner

*Primary Examiner* — Ryan R Yang
(74) *Attorney, Agent, or Firm* — Snyder, Clark, Lesch & Chung, LLP

(57) ABSTRACT

A mobile terminal may include a projection device to project, from a first position of the mobile terminal, visual content onto a projection surface to form a projected image; a sensor to sense movement information indicative of displacement of the mobile terminal with respect to the first position; and a controller to activate, based on the displacement, at least one of a zoom mode or a pan mode, wherein the projection device is further configured to perform, in the at least one of the zoom mode or the pan mode, at least one of zooming or panning with respect to the projected image.

20 Claims, 5 Drawing Sheets

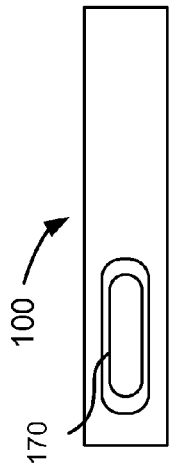
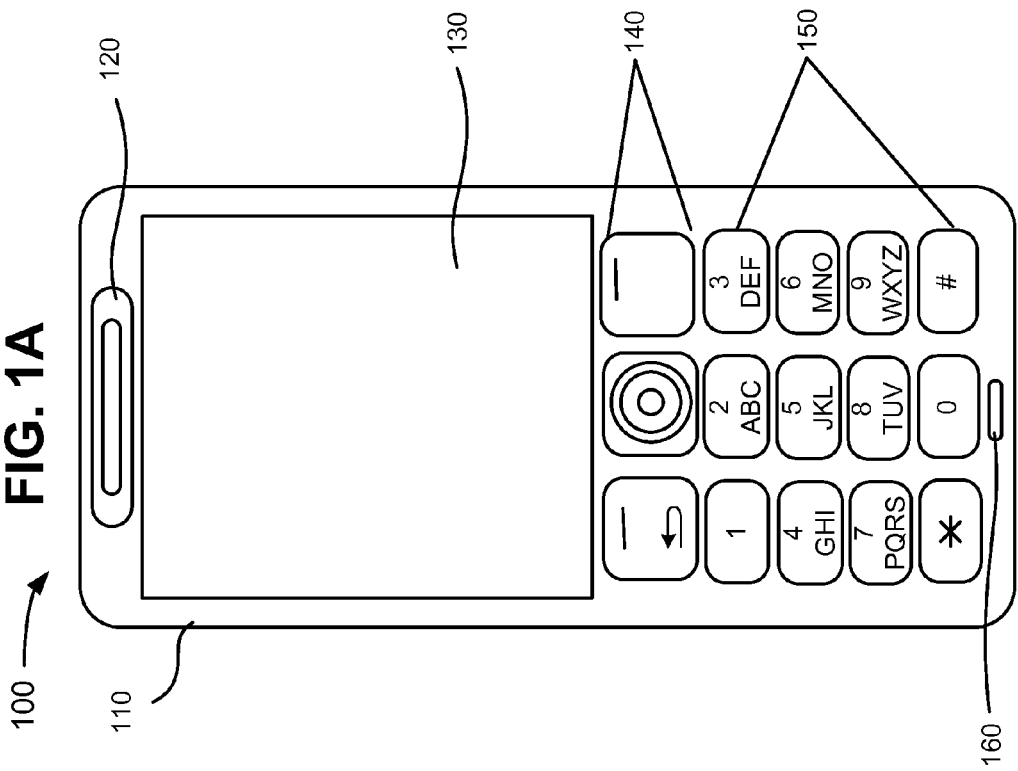

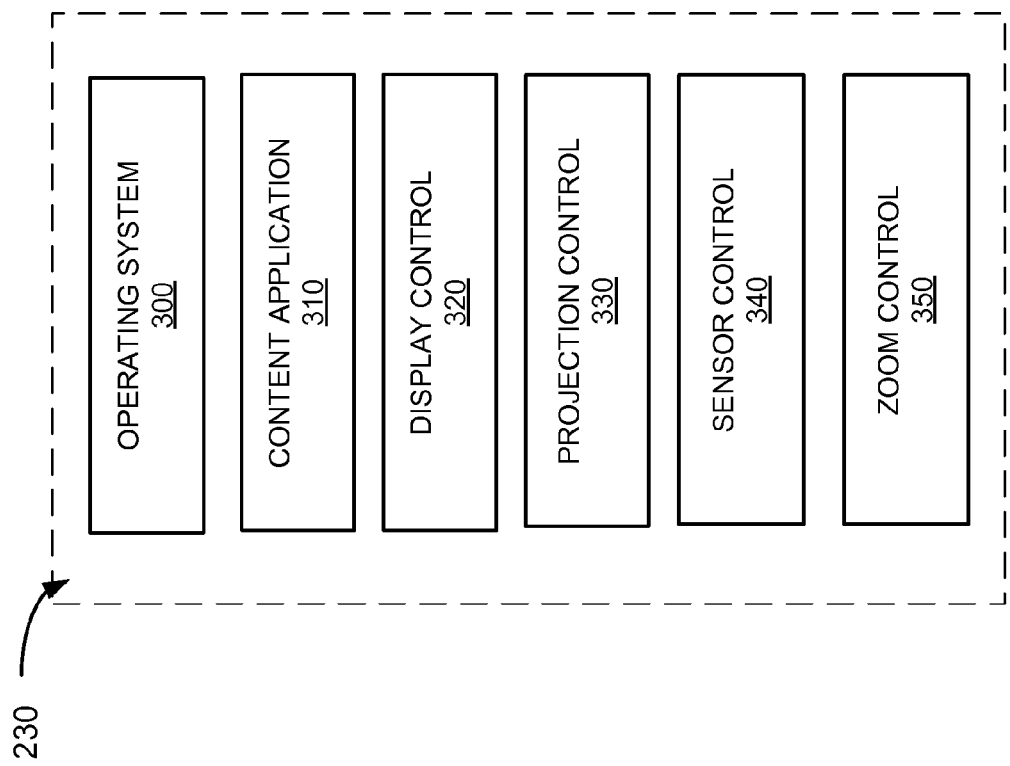

PROJECTION CONTROL

TECHNICAL FIELD OF THE INVENTION

The invention relates generally to mobile devices and, more particularly, to user input received via a touch screen display on a communication device.

DESCRIPTION OF RELATED ART

Computer, communication, entertainment, and image capturing devices, such as personal computers (PCs), laptop computers, mobile terminals, personal digital assistants (PDAs), music playing and gaming devices, digital cameras, video devices, etc., may have a built-in projector that allows a user to project visual media, such as image, video, and graphical information. Integrated projectors of this scale typically offer fixed resolution, fixed lenses (i.e., limited or no zoom), no lens shift capability, and little or no brightness level control.

SUMMARY

According to one aspect, a method, performed in a mobile terminal, may include projecting, from a first position of the mobile terminal, visual content onto a projection surface to form a projected image; sensing first movement information indicative of displacement of the mobile terminal with respect to the first position; activating, based on the displacement, at least one of a zoom mode or a pan mode; and performing, in the at least one of the zoom mode or the pan mode, at least one of zooming or panning with respect to the projected image.

Additionally, the method may further include sensing second movement information indicative of the mobile terminal being in a stationary position, wherein performing the at least one of zooming or panning comprises performing the at least one of zooming or panning when the mobile terminal is in the stationary position.

Additionally, the method may further include sensing second movement information indicative of the mobile terminal being in a stationary position; and deactivating the at least one of the zoom mode or the pan mode when the mobile terminal is in the stationary position.

Additionally, an extent of the performing the at least one of zooming or panning may correspond to a magnitude of the displacement.

Additionally, the method may further include displaying via a display, concurrently with the projection of the visual content, the visual content in an orientation that differs from an orientation of the projected image.

Additionally, the method may further include displaying the visual content via a display of the mobile terminal; receiving, via a user interface, a selection of a portion of the visual content; and performing, in the zoom mode, zooming with respect to the selected portion of the visual content.

Additionally, when the display and the user interface comprise a touchscreen, the method may further include determining the selected portion of the visual content corresponding to a user-contacted location of the touchscreen.

Additionally, the method may further include determining whether the projected image comprises less than an entirety of the visual content, wherein activating the at least one of the zoom mode or the pan mode comprises activating the pan mode only when the projected image comprises less than an entirety of the visual content.

Additionally, when the movement information comprises acceleration information, the method may further include comparing the acceleration information to a threshold, wherein activating the at least one of a zoom mode or a pan mode comprises activating the at least one of the zoom mode or the pan mode only when the acceleration information exceeds the threshold.

In accordance with another aspect, a mobile terminal may include a projection device to project, from a first position of the mobile terminal, visual content onto a projection surface to form a projected image; a sensor to sense movement information indicative of displacement of the mobile terminal with respect to the first position; and a controller to activate, based on the displacement, at least one of a zoom mode or a pan mode, wherein the projection device is further configured to perform, in the at least one of the zoom mode or the pan mode, at least one of zooming or panning with respect to the projected image.

Additionally, the sensor may be further configured to sense second movement information indicative of the mobile terminal being in a stationary position, and the projection device is further configured to perform the at least one of zooming or panning when the mobile terminal is in the stationary position.

Additionally, the sensor may be further configured to sense second movement information indicative of the mobile terminal being in a stationary position, and the controller is further configured to deactivate the at least one of the zoom mode or the pan mode when the mobile terminal is in the stationary position.

Additionally, the projection device may be further configured to determine an extent of the at least one of zooming or panning based on a magnitude of the displacement.

Additionally, the mobile terminal may further include a display to present, concurrently with the projection of the visual content, the visual content in an orientation that differs from an orientation of the projected image.

Additionally, the mobile terminal may further include a display to present the visual content concurrently with the projection of the visual content; and a user interface to receive a selection of a portion of the visual content, wherein the projection device, in the zoom mode, is further configured to perform zooming with respect to the selected portion of the visual content.

Additionally, the display and the user interface may comprise a touchscreen, wherein the controller is further configured to determine the selected portion of the visual content corresponding to a user-contacted location of the touchscreen.

Additionally, the controller is further configured to determine whether the projected image comprises less than an entirety of the visual content, and the controller is further configured to activate the pan mode only when the projected image comprises less than an entirety of the visual content.

Additionally, the movement information may comprise acceleration information, and the controller is further configured to compare the acceleration information to a threshold activate the at least one of a zoom mode or a pan mode only when the acceleration information exceeds the threshold.

In accordance with yet another aspect, a computer-readable medium having stored thereon a plurality of sequences of instructions which, when executed by at least one processor, cause the at least one processor to: determine that first sensed information is indicative of displacement of a mobile terminal with respect to a first position from which the mobile terminal projects visual content onto a projection surface to form a projected image; activate, based on the displacement, at least one of a zoom mode or a pan mode; and control, in the at least one of the zoom mode or the pan mode, at least one of zooming or panning with respect to the projected image.

Additionally, the instructions may further cause the at least one processor to determine that second sensed information is indicative of the mobile terminal attaining a stationary position; and deactivate, based on the stationary position, the at least one of a zoom mode or a pan mode.

BRIEF DESCRIPTION OF THE DRAWINGS

Reference is made to the attached drawings, wherein elements having the same reference number designation may represent like elements throughout.

FIGS. 1A and 1B are front and end views, respectively, of an exemplary device in which methods and systems described herein may be implemented;

FIG. 3 is a block diagram of components implemented in the device of FIG. 2 according to an exemplary implementation;

DETAILED DESCRIPTION

Figure 2:
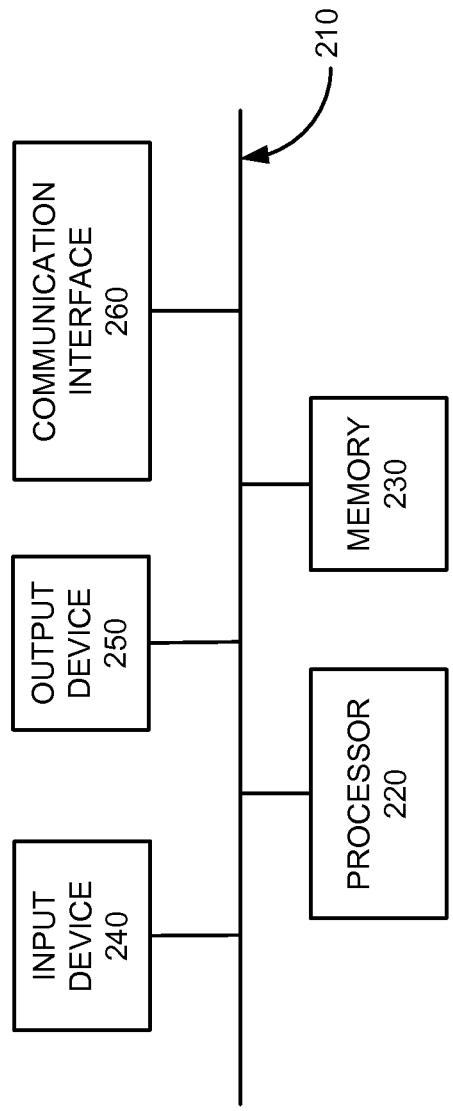
FIG. 2 is a functional block diagram of exemplary components implemented in the device of FIG. 1.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

FIGS. 1A and 1B illustrate an exemplary user device 100 in which methods and systems described herein may be implemented. Typically, user device 100 may include any of the following devices having image projection capabilities: a hand-held projector; a pocket projector; a tablet computer; a mobile telephone; a cellular phone; a smart phone; a personal communication system (PCS) terminal that may combine a cellular radiotelephone with data processing, facsimile, and/or data communication capabilities; a laptop; a personal digital assistant (PDA) that may include a telephone, a media playing device (e.g., an MPEG audio layer 3 (MP3) player, a gaming console device, etc.), a peripheral (e.g., headset audio device); a digital camera; or another type of computational or communication device.

Referring to FIGS. 1A and 1B, user device 100 may include a housing 110, a speaker 120, a display 130, control buttons 140, a keypad 150, a microphone 160, and a projection device 170. Housing 110 may provide structural support for the functional components of user device 100. Speaker 120 may provide audible information to a user of user device 100. Microphone 160 may receive audible information from the user for communicating and/or activating applications or routines stored within user device 100. Housing 110 may be configured to provide one or more connections to external microphone and/or speaker devices.

Display 130 may provide visual information to the user regarding various functions, including sending and/or receiving telephone calls, electronic mail (e-mail), instant messages, short message service (SMS) messages, etc. Display 130 may also present media using various applications in user device 100, such as spreadsheets created and/or stored by user device 100, images stored captured and/or stored by user device 100, video games being played by a user, slideshow presentations created and/or stored by user device 100, content accessed using a web browser, (e.g., downloaded web pages), video captured by and/or stored by user device 100, etc.

Consistent with implementations described herein, display 130 may be a touch screen display device that allows a user to enter commands and/or selections using a finger, a stylus, a mouse, a pointing device, or some other instrument, for example, with respect to displayed content. For example, display 130 may be a resistive touch screen, a capacitive touch screen, an optical touch screen, an infrared touch screen, a surface acoustic wave touch screen, or any other type of touch screen device that registers an input based on a contact with the screen/display 130.

Control buttons 140 may permit the user to interact with user device 100 to cause user device 100 to perform one or more operations, such as place a telephone call, play various media, etc. In an exemplary implementation, control buttons 140 may include one or more buttons that control various applications associated with display 130.

Keypad 150 may include a standard telephone keypad. In other implementations, keypad 150 may include other buttons/keys, such as a QWERTY keypad, etc. Although user device 100 shown in FIG. 1 includes keypad 150 and a number of control buttons 140, it should be understood that user device 100 need not include such features. Rather, in some implementations, user device 100 may include touch screen display 130 alone, or in combination with more or fewer control buttons 130.

Projection device 170 may include an integrated projector, such as a mini projector, a micro projector, a nano projector, a pico projector, etc., configured to project visual media onto a viewing surface, such as a screen, a wall, etc. Projection device 170 may be configured to present audio/visual content in conjunction with speaker 120 and/or an external sound system, for example. Projection device 170 may be a fixed resolution device. Projection device 170 may include a power source, electronics, a light (e.g., laser, LED) source, optics, and mirrors, for example. Projection device 170 may include autofocus devices. In some embodiments, projection device 170 may not include autofocus devices. Projection device 170 is shown as having a projection widow on an end surface of user device 100, but it will be appreciated that the projection window may be disposed on one or more other surfaces of user device 100.

FIG. 2 is a diagram illustrating components of user device 100 according to an exemplary implementation. User device 100 may include a bus 210, a processor 220, a memory 230, an input device 240, an output device 250, and a communication interface 260. Bus 210 may permit communication among the components of user device 100. One skilled in the art would recognize that user device 100 may be configured in a number of other ways and may include other or different elements. For example, user device 100 may include one or more modulators, demodulators, encoders, decoders, etc., for processing data.

Processor 220 may include a processor, microprocessor, an application specific integrated circuit (ASIC), field programmable gate array (FPGA) or other processing logic. Processor 220 may execute software instructions/programs or data structures to control operation of user device 100.

Memory 230 may include a random access memory (RAM) or another type of dynamic storage device that stores information and instructions for execution by processor 220;

a read only memory (ROM) or another type of static storage device that stores static information and instructions for use by processor 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processor 220. Instructions used by processor 220 may also, or alternatively, be stored in another type of computer-readable medium accessible by processor 220. A computer-readable medium may include one or more memory devices.

Input device 240 may include mechanisms that permit an operator to input information to user device 100, such as microphone 160, keypad 150, control buttons 140, a keyboard (e.g., a QWERTY keyboard, a Dvorak keyboard, etc.), a gesture-based device, an optical character recognition (OCR)-based device, a joystick, a touch-based device, a virtual keyboard, a speech-to-text engine, a mouse, a pen, voice recognition and/or biometric mechanisms, etc. In an exemplary implementation, display 130 may be a touch screen display that acts as an input device.

Output device 250 may include one or more mechanisms that presents media to a user, including a display, such as display 130, and a projector, such as projection device 170, etc. As described above, in an exemplary implementation, display 130 may be a touch screen display, and thus may function as both an input device and an output device. Projection device 170 may be an integrated projector that projects content retrieved from memory 230 as instructed by processor 220.

Communication interface 260 may include a transceiver mechanism that enables user device 100 to communicate with other devices and/or systems. For example, communication interface 260 may include a modem or an Ethernet interface to a LAN. Communication interface 260 may also include mechanisms for communicating via a network, such as a wireless network. For example, communication interface 260 may include one or more radio frequency (RF) transmitters, receivers and/or transceivers and one or more antennas for transmitting and receiving RF data via a network.

User device 100 may provide a platform for a user to send and receive communications (e.g., telephone calls, electronic mail messages, text messages, multi-media messages, short message service (SMS) messages, etc.), display pictures and/or video, browse the Internet, or perform various other functions. User device 100, as described in detail below, may also perform processing associated with enabling a user to control a size of a projected image and, at a same time, perform panning and zooming to control a level of detail shown in the projected image without requiring cumbersome manual operation of control mechanisms by a user.

User device 100 may perform these and other operations in response to processor 220 executing sequences of instructions contained in a computer-readable medium, such as memory 230. Such instructions may be read into memory 230 from another computer-readable medium via, for example, communication interface 260. In alternative embodiments, hard-wired circuitry may be used in place of or in combination with software instructions to implement processes consistent with one or more implementations. Thus, implementations described herein are not limited to any specific combination of hardware circuitry and software.

FIG. 3 is an exemplary block diagram of components implemented in user device 100 of FIG. 2. In an exemplary implementation, all or some of the components illustrated in FIG. 3 may be stored in memory 230. For example, referring to FIG. 3, memory 230 may include an operating system (OS) 300, a content application 310, a display control 320, a projection 330, a sensor control 340, and a zoom control 350.

Operating system 300 may include software instructions for managing hardware and software resources of user device 100. Operating system 300 may manage, for example, its file system, device drivers, communication resources (e.g., radio receiver(s), transmission control protocol (TCP)/IP stack), event notifications, etc. Operating system 300 may include Symbian®, Android™, Windows Phone®, Apple® iOS, etc. In an implementation, operating system 300 may be configured to automatically cause projection control 330 to operate in a zoom mode and/or pan mode based on, for example, acceleration information obtained from sensor control 340, etc. In some implementations, a user may manually select the zoom mode and/or pan mode.

Content application 310 may include any software program or an element of a software program (e.g., a process) executed by processor 220 that provides media content to display 130 and/or projection device 170. Exemplary content application 310 may include an Internet browser, an image and/or video displaying application, an email client, a text messaging client, an instant messaging client, and productivity applications, such as a word processor, a diagramming program, a spreadsheet editor, a presentation program, a graphics editor, etc. As used herein, the term "content application" may refer to any application that outputs or otherwise presents text, images, video, graphics, or other visual information to display 130 and/or projection device 170.

Display control 320 may include logic and/or one or more devices configured to present content from content application 310 via display 130. For example, display control 320 may be configured to optimize and output visual content associated with content application 310 based on the specifications (e.g., resolution, etc.) associated with display 130. Display control 320 may control zooming functions (e.g., determining level of image magnification) and/or panning functions with respect to displaying visual content.

Projection control 330 may include logic and/or one or more devices configured to present content from content application 310 via projection device 170. For example, display control 330 may be configured to optimize and output visual content associated with content application 310 based on the specifications (e.g., resolution, throw ratio, etc.) associated with projection device 170. Projection control 330 may control zooming functions (e.g., determining level of image magnification), panning functions, and/or autofocusing functions with respect to projecting visual content.

Sensor control 340 may include logic and/or one or more devices to analyze one or more signals received from various sensors (e.g., an accelerometer, a gyrometer, infrared (IR), ultrasound, etc.) related to displacement of user device 100 from one location to another. For example, user device 100 may include one or more accelerometers configured to measure acceleration of user device 100 in different directions. In one embodiment, user device 100 may include an accelerometer configured to measure acceleration of user device 100 in multiple (e.g., three) dimensions. In one embodiment, the accelerometer(s) may be manually and/or automatically activated.

Sensor control 340 may be configured to request acceleration information from the accelerometer(s). Sensor control 340 may analyze the acceleration information to determine a displacement vector associated with movement of user device 100, for example, from a previous (e.g., a rest) position. Sensor control 340 may determine, from the displacement vector, an acceleration, a distance, an amount of time, and/or a direction associated with the movement of user device 100. Sensor control 340 may process the information into individual (e.g., three-dimensional) spatial components of the displacement vector. For example, sensor control 340 may detect, based on additional acceleration information received from the accelerometer(s), that user device 100 has decelerated and come to rest.

In one implementation, sensor control 340 may perform similar processing of displacement information received from other types of sensors. For example, IR or ultrasound sensors may obtain displacement information with respect to a fixed point of reference (e.g., a projection surface). Sensor control 340 may process such displacement information to determine a distance over which user device 100 has moved, for example, relative to the projection surface. In one implementation, user device may include a gyroscope that obtains information with respect to an orientation of user device 100.

In one implementation, zoom control 350 may be configured to activate and/or deactivate a zoom mode and/or a pan mode based on information provided by sensor control 340, for example, with respect to displacement of user device 100, and/or user input. In one embodiment, zoom control 350 may compare a magnitude of the displacement to a threshold value. Zoom control 350 may activate a zoom mode and/or a pan mode when the magnitude of the displacement exceeds the threshold value. Zoom control 350 may not activate a zoom mode and/or a pan mode when the magnitude of the displacement does not exceed the threshold value.

Zoom control 350 may be configured to perform zooming based on movement of user device 100 along an axis of projection, that is, toward and/or away from a projection surface. Zoom control 350 may perform panning based on movement of user device 100 in a plane that is parallel to a projection surface. In one, embodiment, zoom control 350 may determine whether a current projected image includes an entirety of the corresponding visual content. Zoom control 350 may not perform panning when the current projected image includes an entirety of the corresponding visual content.

Zoom control 350 may be configured to determine an amount of zooming (i.e., zoom level) and/or panning to be performed based on one or more components of the displacement information, in any combination. In one implementation, zoom control 350 may determine a zoom level and/or an extent of panning based on a level of acceleration, a duration of the displacement and/or an amount of distance user device 100 moved from a previous spot, for example, independently and/or in any combination. Zoom control 350 may zoom in when user device 100 is moved toward a projection surface and zoom out when user device 100 is moved away from the projection surface.

In one implementation, zoom control 350 may provide display control 320 and/or projection control 330 with one or more of the above zooming and/or panning instructions during the displacement of user device 100. In another implementation, zoom control 350 may not provide display control 320 and/or projection control 330 with one or more of the above zooming and/or panning instructions during the displacement of user device 100. For example, display control 320 may perform zooming and/or panning with respect to an image displayed via display 130 during the displacement of user device 100, while projection control 330 may not perform corresponding zooming and/or panning with respect to a projected image until user device 100 has stopped moving. In one implementation, the displayed image may be presented in a particular orientation (e.g., portrait) while the corresponding projected image be presented in a different particular orientation (e.g., landscape). Alternatively, the two orientations may be the same.

Zoom control 350 may be configured to determine zooming and/or panning based on the information provided from sensor control 340 in conjunction with user input received, for example, via display 130, control buttons 140, and/or keypad 150. For example, instead of performing image-center zooming, zooming may be performed with respect to a user-selected portion of a displayed/projected image. That is, a user may touch a portion of the displayed image or press a numbered key corresponding to an image sector to identify the portion of the displayed/projected image to be zoomed. For example, a sectored overlay may be superimposed over the displayed image on display 130 (and not over the projected image), for example, in a 3 by 3 matrix and labeled with reference numbers 1-9 corresponding to the numbered keypad.

Zoom control 350 may be configured to determine a rate of zooming and/or panning based on the information provided from sensor control 340. Zoom control 350 may be configured to determine rate of zooming (i.e., zoom level) and/or panning to be performed based on one or more components of the displacement information independently, or in any combination. For example, zoom control may determine a rate of zooming based on the duration of displacement of user device, independent of a distance associated with the displacement. Thus, a prolonged movement over a relatively short distance may correspond to a relatively high degree of zooming. In this manner, movement of user device 100 over the relatively short distance may produce a negligible change in the size of the projected image.

The programs and logic blocks illustrated in FIG. 3 are provided for simplicity. It should be understood that other configurations may be possible. It should also be understood that functions described as being performed by one program or logic block within a program may alternatively be performed by another program and/or another logic block. In addition, functions described as being performed by multiple programs or logic blocks may alternatively be performed by a single program or logic block/device.

Figure 4A:
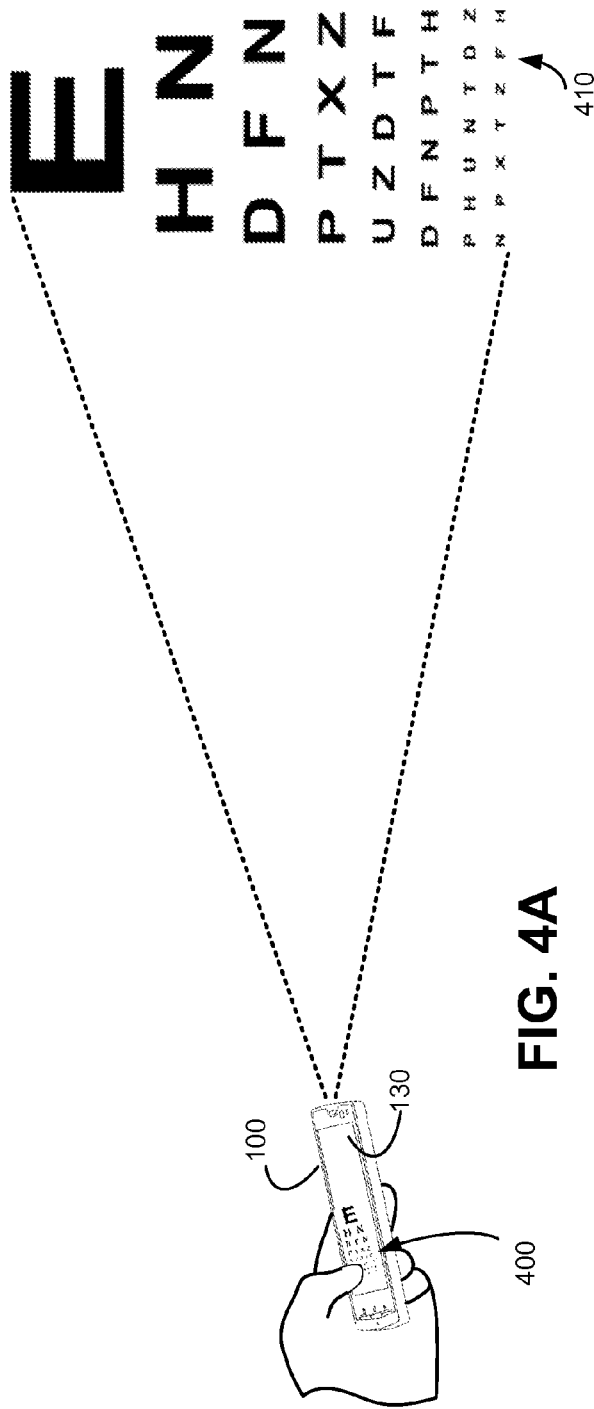
FIGS. 4A and 4B illustrate exemplary image projection performed according to an exemplary implementation.
Figure 4B:
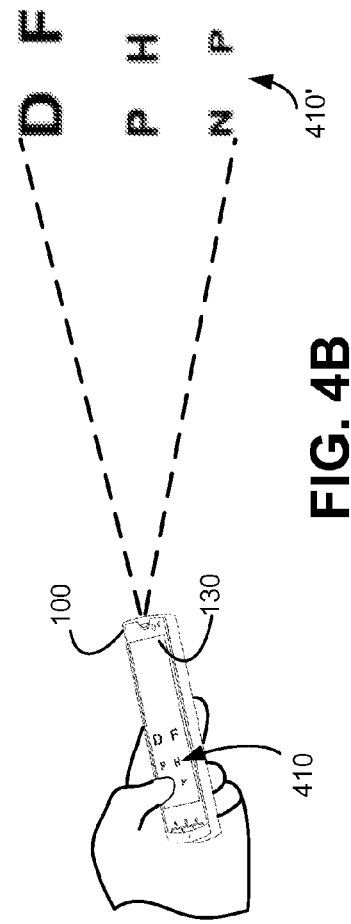

FIGS. 4A and 4B illustrate an example consistent with implementations described herein. More particularly, FIG. 4A illustrates a displayed image 400 (here, an eye chart) on display 130 and a projected image 410 projected from user device 100 (e.g., via projection device 170) onto a projection surface at a first particular distance from user device 100. FIG. 4B illustrates a zoomed-in displayed image 400' (here, a partial view of eye chart 400) on display 130 and a projected image 410' projected from user device 100 (e.g., via projection device 170) onto the projection surface at a second particular distance from user device 100.

As discussed above, projected image 410' may have been selected by the user panning user device 100 with respect to projected image 400. Alternatively, projected image 410' may have been selected by the user touching a corresponding portion of displayed image 400 on display 130. Alternatively, projected image 410' may have been selected by the user pressing a number (e.g., "7") corresponding to a numbered overlay (e.g., a 3×3 grid) presented on displayed image 400 on display 130 (and not on projected image 410).

Figure 5:
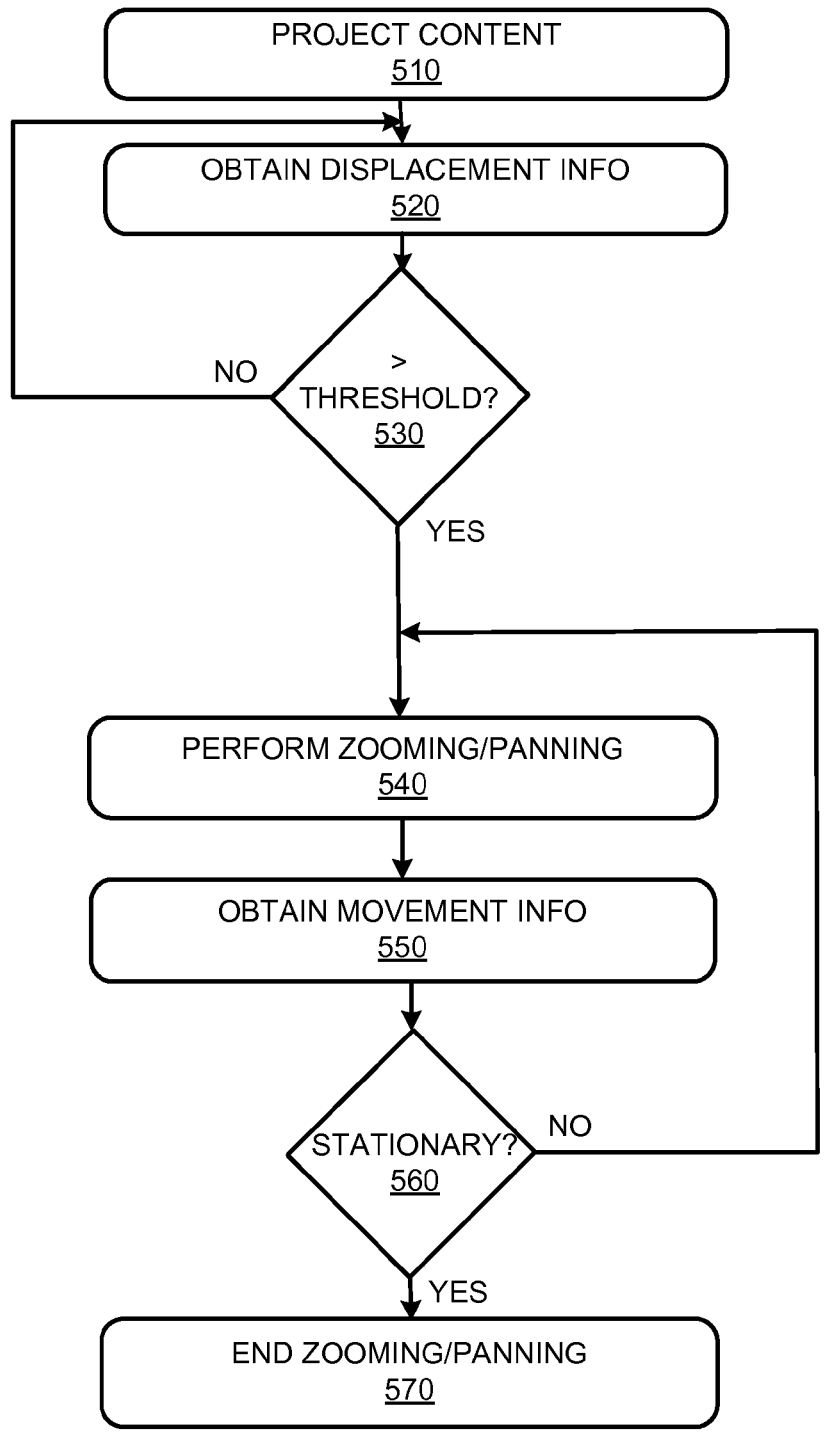
FIG. 5 is a flow diagram illustrating exemplary processing associated with selecting a content item.

FIG. 5 illustrates exemplary processing for projecting content when a user operates a user device in a projection mode. Processing may begin with the user device projecting content onto a projection surface to form a projected image over a projection area (block 510). For example, content application 310 may output visual media content, such as a document, a picture, a video, etc., for example, to display control 320 and/or projection control 330, which then present(s) at least a portion of the content.

Sensor control 340 may, during projection, obtain information related to movement of user device 100 relative to, for example, the projection surface (block 520). For example, an accelerometer sensor may provide information associated with displacement of user device 100 from a position, for example, at which projection was initiated.

Zoom control 350 may determine whether the movement information exceeds a particular threshold (block 530). When, for example, zoom control 350 determines that user device 100 has not been moved at greater than a particular acceleration value (e.g., corresponding to a user repositioning user device 100 to fit the projected image to a screen, etc.) (block 530—NO), user device 100 may continue to project the content (block 610) without performing zooming with respect to the projected content. Alternatively, zoom control 350 may determine that a value for the particular displacement parameter exceeds the threshold value corresponding to that particular displacement parameter (block 530—YES).

Zoom control 350 may provide zooming and/or panning instructions to projection control 330 and/or display control 320 (block 630). Projection control 330 and/or display control 320 may perform zooming and/or panning based on the instructions (block 540). Sensor control 340 may obtain additional information related to movement of user device 100 relative to the projection surface (block 550). Zoom control may determine, additional information from sensor control 340, whether user device is currently stationary (block 560). If so, zoom control may deactivate the zoom mode and/or the pan mode (block 570). Otherwise, zoom control my provide further instructions for zooming and/or panning based on the additional information (block 540).

Conclusion

Implementations described herein may provide systems and methods for controlling zooming and/or panning functions with respect to displayed and/or projected images. In this manner, a user can simultaneously control clarity of projected images by changing the throw distance (and thus the size of the projected image), the level of brightness per unit area over the projection area, and the level of image detail provided (by zooming in and out), for example, in an image projected from a fixed resolution device.

The foregoing description of the embodiments described herein provides illustration and description, but is not intended to be exhaustive or to limit the invention to the precise form disclosed. Modifications and variations are possible in light of the above teachings or may be acquired from the practice of the invention.

Further, while series of acts have been described with respect to FIG. 5, the order of the acts may be varied in other implementations consistent with the invention. Moreover, non-dependent acts may be performed in parallel.

It will also be apparent to one of ordinary skill in the art that aspects of the invention, as described above, may be implemented in computer devices, cellular communication devices/systems, media playing devices, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, an FPGA or other processing logic, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

What is claimed is:

1. A method performed in a mobile terminal, the method comprising:
   projecting, from a first position of the mobile terminal, visual content onto a projection surface to form a projected image;
   sensing first movement information indicative of displacement of the mobile terminal with respect to the first position;
   determining whether the projected image comprises less than an entirety of the visual content;
   activating, based on the displacement, at least one of a zoom mode or a pan mode, wherein the pan mode is activated responsive to a determination that the projected image comprises less than the entirety of the visual content; and
   performing, in the at least one of the zoom mode or the pan mode, at least one of zooming or panning with respect to the projected image.

2. The method of claim 1, further comprising:
   sensing second movement information indicative of the mobile terminal being in a stationary position, wherein performing the at least one of zooming or panning comprises performing the at least one of zooming or panning when the mobile terminal is in the stationary position.

3. The method of claim 1, further comprising:
   sensing second movement information indicative of the mobile terminal being in a stationary position; and
   deactivating the at least one of the zoom mode or the pan mode when the mobile terminal is in the stationary position.

4. The method of claim 1, wherein an extent of the performing the at least one of zooming or panning corresponds to a magnitude of the displacement.

5. The method of claim 1, further comprising:
   displaying via a display, concurrently with the projection of the visual content, the visual content in an orientation that differs from an orientation of the projected image.

6. The method of claim 1, further comprising:
- displaying the visual content via a display of the mobile terminal;
- receiving, via a user interface, a selection of a portion of the visual content; and
- performing, in the zoom mode, zooming with respect to the selected portion of the visual content.

7. The method of claim 6, wherein the display and the user interface comprise a touchscreen, the method further comprising:
- determining the selected portion of the visual content corresponding to a user-contacted location of the touchscreen.

8. The method of claim 1, wherein the movement information comprises acceleration information, the method further comprising:
- comparing the acceleration information to a threshold, wherein activating the at least one of a zoom mode or a pan mode comprises activating the at least one of the zoom mode or the pan mode only when the acceleration information exceeds the threshold.

9. A mobile terminal comprising:
- a projection device to project, from a first position of the mobile terminal, visual content onto a projection surface to form a projected image;
- a sensor to sense movement information indicative of displacement of the mobile terminal with respect to the first position, wherein the movement information comprises acceleration information; and
- a controller configured to:
  - compare the acceleration information to a threshold, and
  - activate, based on the displacement and responsive to a determination that the acceleration information exceeds the threshold, at least one of a zoom mode or a pan mode,
- wherein the projection device is further configured to perform, in the at least one of the zoom mode or the pan mode, at least one of zooming or panning with respect to the projected image.

10. The mobile terminal of claim 9, wherein the sensor is further configured to sense second movement information indicative of the mobile terminal being in a stationary position, and the projection device is further configured to perform the at least one of zooming or panning when the mobile terminal is in the stationary position.

11. The mobile terminal of claim 9, wherein the sensor is further configured to sense second movement information indicative of the mobile terminal being in a stationary position, and the controller is further configured to deactivate the at least one of the zoom mode or the pan mode when the mobile terminal is in the stationary position.

12. The mobile terminal of claim 9, wherein the projection device is to determine an extent of the at least one of zooming or panning based on a magnitude of the displacement.

13. The mobile terminal of claim 9, further comprising:
- a display to present, concurrently with the projection of the visual content, the visual content in an orientation that differs from an orientation of the projected image.

14. The mobile terminal of claim 9, further comprising:
- a display to present the visual content concurrently with the projection of the visual content; and
- a user interface to receive a selection of a portion of the visual content, wherein the projection device, in the zoom mode, is further configured to perform zooming with respect to the selected portion of the visual content.

15. The mobile terminal of claim 14, wherein the display and the user interface comprise a touchscreen, wherein the controller is further configured to determine the selected portion of the visual content corresponding to a user-contacted location of the touchscreen.

16. A mobile terminal comprising:
- a projection device to project, from a first position of the mobile terminal, visual content onto a projection surface to form a projected image;
- a sensor to sense movement information indicative of displacement of the mobile terminal with respect to the first position; and
- a controller to activate, based on the displacement, at least one of a zoom mode or a pan mode,
  - wherein the projection device is further configured to perform, in the at least one of the zoom mode or the pan mode, at least one of zooming or panning with respect to the projected image,
  - wherein the controller is further configured to determine whether the projected image comprises less than an entirety of the visual content, and the controller is further configured to activate the pan mode only when the projected image comprises less than an entirety of the visual content.

17. A non-transitory computer-readable medium having stored thereon a plurality of sequences of instructions which, when executed by at least one processor, cause the at least one processor to:
- determine that first sensed information is indicative of displacement of a mobile terminal with respect to a first position from which the mobile terminal projects visual content onto a projection surface to form a projected image;
- determine whether the projected image comprises less than an entirety of the visual content;
- activate, based on the displacement, at least one of a zoom mode or a pan mode, wherein the pan mode is activated responsive to a determination that the projected image comprises less than the entirety of the visual content; and
- control, in the at least one of the zoom mode or the pan mode, at least one of zooming or panning with respect to the projected image.

18. The non-transitory computer-readable medium of claim 17, wherein the instructions further cause the at least one processor to:
- determine that second sensed information is indicative of the mobile terminal attaining a stationary position; and
- deactivate, based on the stationary position, the at least one of a zoom mode or a pan mode.

19. The non-transitory computer-readable medium of claim 17, wherein the instructions further cause the at least one processor to:
- determine that the first sensed information comprises acceleration information, and
- compare the acceleration information to a threshold.

20. The non-transitory computer-readable medium of claim 19, wherein the instructions further cause the at least one processor to:
- activate the at least one of a zoom mode or a pan mode responsive to a determination that the acceleration information exceeds the threshold.

* * * * *